United States Patent
Mueller

[11] 3,777,616
[45] Dec. 11, 1973

[54] CONTROLLED CUTTING
[76] Inventor: Joseph F. Mueller, 763 South St., Dedham, Mass. 02343
[22] Filed: Dec. 22, 1971
[21] Appl. No.: 210,930

[52] U.S. Cl.................. 90/13.2, 90/13.2, 90/13 R, 33/23 C, 308/6 R
[51] Int. Cl. ............................................. B23c 1/16
[58] Field of Search ................ 90/13.2, 13.1, 13 R, 90/62 R, 21 R; 33/23 C, 1 M, 23 K; 308/6 R, 6 B; 51/100 R, 100 P

[56] References Cited
UNITED STATES PATENTS

| 3,171,207 | 3/1965 | Wormser | 33/23 C |
| 2,539,027 | 1/1951 | Marchant | 33/23 K |
| 2,746,813 | 5/1956 | Massa | 308/3 R X |
| 3,450,447 | 6/1969 | Hacker | 90/13.2 |

Primary Examiner—Gil Weidenfeld
Attorney—Charles Hieken

[57] ABSTRACT

A platform is mounted for movement in x and y directions and carries a stylus, vibrator and a cutting tool. An operator moves the stylus along a master pattern causing the cutter to cut the master pattern in a sheet of suitable material, such as, 1/16 inch magnesium, plastic or alluminumate.

4 Claims, 2 Drawing Figures

PATENTED DEC 11 1973

3,777,616

CONTROLLED CUTTING

BACKGROUND OF THE INVENTION

The present invention relates in general to controlled cutting and more particularly concerns improved apparatus and techniques for precisely and repeatedly following a master pattern with a cutting tool. A typical prior art approach comprises a pantograph. A linkage interconnects a cutting tool to a stylus so that movement of the latter produce corresponding movements of the former. While conventional pantographs are acceptable for relatively small cutting jobs, it is difficult to produce large cut patterns with a pantograph.

Accordingly, it is an important object of this invention to provide imrpoved techniques for precisely following a master pattern with a cutting tool.

It is a further object of the invention to achieve the preceding object repeatedly.

It is a further object of the invention to achieve one or more of the preceding objects with relatively large patterns.

It is a further object of the invention to achieve one or more of the preceding objects while accurately following relatively complex master patterns including lines in various directions and curves of varying radii.

It is a further object of the invention to achieve one or more of the preceding objects with apparatus that is relatively easy and inexpensive to fabricate and may be operated by relatively unskilled personnel.

SUMMARY OF THE INVENTION

According to the invention, there is means for mechanically interconnecting stylus means and cutting tool means so that the cutting tool means accurately reproduces a master pattern in a cutting area in a cutting plane that is parallel to a tracing plane where the stylus moves over the master pattern and means for vibrating at least the stylus and x-y assembly in a direction orthogonal to the cutting and tracing planes over a small amplitude, typically five mils and smaller than the depth of the groove cut by the cutting tool. Means are provided for supporting the assembly comprising the stylus means and the cutting tool means to permit slight translation in a direction orthogonal to the cutting and tracing planes and means for vibrating the assembly.

According to one aspect of the invention the assembly is supported on orthogonal x and y pairs of rods for allowing the assembly to move in the x and y directions, respectively. The rods are of slightly elliptical cross section with the minor axis perpendicular to the tracing and cutting planes and of the order of five mils less than the major axis to form the inner race of support ball bearings having a circular outer race channel of inside diameter corresponding substantially to the major diameter of the rod plus twice a ball diameter.

Numerous other features, objects and advantages of the invention will become apparent from the following specification when read in connection with the accompanying drawing in which:

DETAIL DESCRIPTION OF PREFERRED EMBODIMENTS

Figure 1:
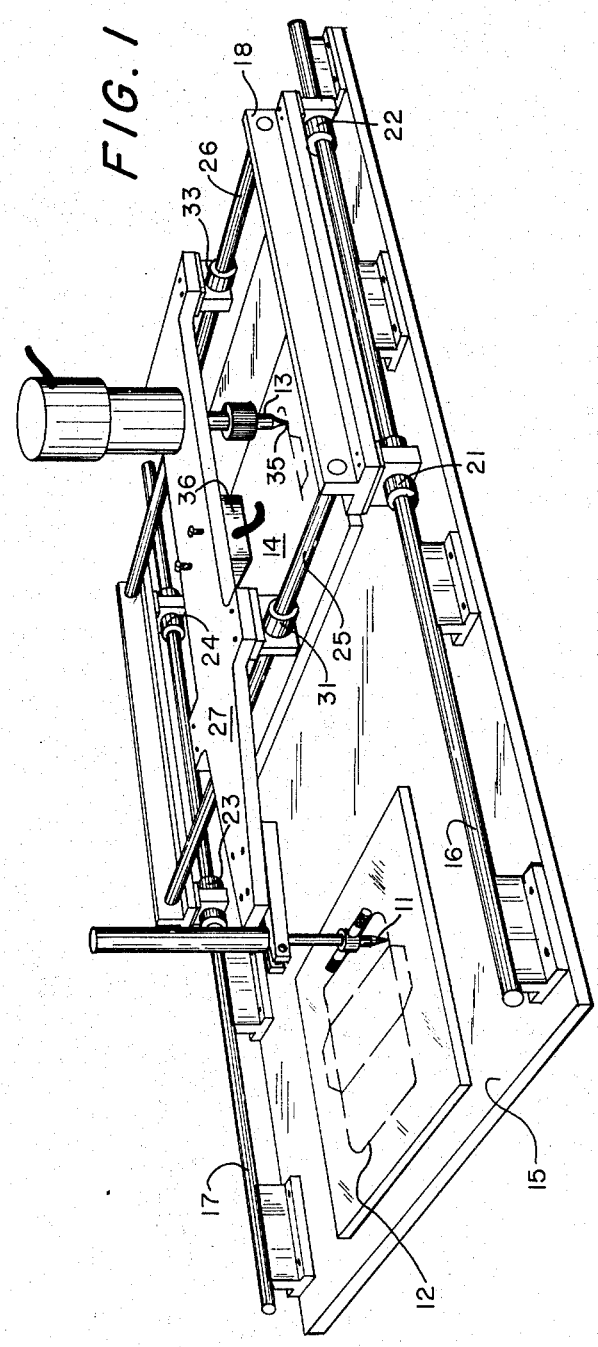
FIG. 1 is a perspective view of an exemplary embodiment of the invention.

With reference now to the drawing and more particularly FIG. 1 thereof, there is shown a perspective view of an embodiment of the invention. As stylus 11 moves along the lines of master pattern 12 in the tracing plane, cutting tool 13 cuts out the corresponding pattern on stencil 14 in the cutting plane on table 15. Table 15 carries a pair of X rods 16 and 17. A frame 18 is coupled to rods 16 and 17 by outer races 21, 22, 23 and 24 which comprise ball bearings having respective ones of rods 16 and 17 as the inner race.

Frame 18 carries a pair of Y rods 25 and 26 to which support platform 27 is attached by outer races such as 31 and 33 comprising ball bearings with respective ones of rods 25 and 26 forming the inner races. Platform 27 hides the other pair of ball bearings and carries rotary cutting tool 13 of conventional type that may be displaced through means such as a controlled solenoid from a noncutting position above the work to a cutting position with the cutting edge 35 in contact with the work when stylus 11 is displaced downward for contact with master pattern 12 during tracing. The specific techniques, typically involving the use of microswitches and solenoids, for accomplishing this vertical displacement is well known in the art and not discussed further here in order to avoid obscuring the principles of this invention.

Platform 27 also carries a vibrator 36, that operates at 120 Hz. The vibrator causes the platform 27, stylus 11 and cutting edge 35 to vibrate vertically, typically at an amplitude of 5 mils, a distance less than the cut made in stencil 14 so that cutting efficiency is not impaired while greatly enhancing the ability of the stylus and cutting tool to accurately follow a complex master pattern 12 that may include lines in various orientations and curves of various radii of curvature.

Figure 2:
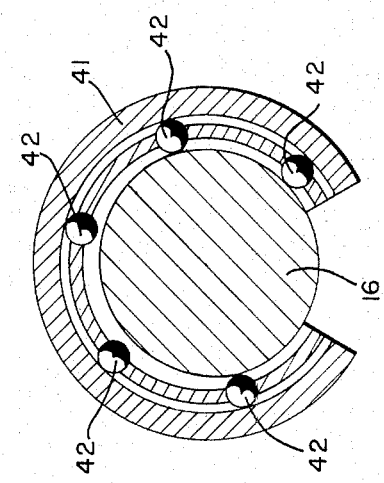
FIG. 2 is a sectional view through a roller bearing exaggerating the ellipticity of the rod to illustrate a feature of this bearing which allows movement orthogonal to the tracing and cutting planes while restricting movement parallel to these planes.

To allow the vertical vibration in a plane normal to the x-y tracing and cutting plane, means are provided for supporting the assembly to allow such vertical displacement. A preferred support means which typifies the eight ball bearings is illustrated in the sectional view in FIG. 2 through section 2—2 of ball bearing 21. Rod 16 is shown as being slightly smaller in diameter from top-to-bottom and from side-to-side, this distance typically being 5 mils. Yet the inside diameter of outer race 41 is a perfect nearly complete circular sector and substantially equal to the sum of the major diameter of shaft 16 (from side-to-side) plus twice the diameter of one of balls 42. The invention would operate if the rods were perfectly circular and 5 mils less than the diameter required for a snug fit with the balls in place; however, the approach illustrated in FIG. 2 has certain advantages. It resists movement in the x-y plane and helps insure that the cutting tool will cut along a smooth line. It is more practical to cut down slightly only top and bottom portions of a perfectly circular rod designed as a snug inner race than to turn such a rod down precisely. Reducing the top and bottom may be accomplished by holding the rod stationary and running an abrasive or lapping wheel along the top and bottom. Turning the rod requires rotating it in a lathe. However, it is to be understood that the specific techniques illustrated above are by way of example for illustrating the best mode now contemplated for practicing the invention. Numerous other approaches may be practiced within the principles of the invention.

For example, T bearings with the desired vertical play could be employed as supports. Numerous other supports having the desired vertical play could be employed. The principles of the invention could also be applied to a conventional pantograph.

The invention is especially useful in connection with the x-y platform support. Without the vibration in the vertical plane, it is more difficult for the assembly to track complex master patterns. Once the assembly starts moving in the x direction, it seems to want to keep moving in that direction, making the following of changes in line direction difficult to follow. With the vertical vibration introduced, the assembly easily moves in any direction so that curves and changes in line direction are easily followed.

The invention is especially useful in connection with cutting stencils in the form of relatively large box blanks that are then used as guides to jig out die boards that may be used to accomodate cutting edges for cutting out box blanks. The box blanks may then be formed into boxes.

The actual working model of the invention shown in FIG. 1 may copy on a 1:1 basis reproducing a master 30 X 36 inches while cutting through aluminum, magnesium, plastic 1/16 inch thick plate.

It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for controlled cutting comprising,
stylus means for tracing a master pattern,
cutting means for cutting the copy of the pattern traced by said stylus in a cutting plane parallel to the plane of said master pattern,
means for mechanically intercoupling said stylus means and said cutting means so that movements of said stylus are followed by said cutting means,
means for vibrating at least said stylus means in a direction orthogonal to said cutting plane,
said stylus means, said cutting means and said means for mechanically intercoupling including said means for vibrating to form an assembly vibrated by said means for vibrating,
base means,
and means for supporting said assembly on said base for permitting slight displacement thereof in a direction orthogonal to said cutting plane,
said means for supporting comprising means for allowing relative displacement of said assembly in a first direction parallel to said cutting plane and in a second direction orthogonal to said first direction parallel to said cutting plane and further comprising,
at least one rod comprising the inside race of a ballbearing and of generally elliptical cross section having a minor diameter orthogonal to said cutting plane only slightly less than its major diameter and surrounded by an outer race of circular cross section with balls therebetween,
the inside diameter of said outer race in the channel thereof including said balls having a diameter substantially equal to the major diameter of said rod plus twice the diameter of a said ball.

2. Apparatus for controlled cutting in accordance with claim 1 wherein there are two mutually orthogonal pairs of said rods for allowing said stylus and cutting means to move together in said first and second directions.

3. Apparatus for controlled cutting comprising,
stylus means for tracing a master pattern,
cutting means for cutting the copy of the pattern traced by said stylus in a cutting plane parallel to the plane of said master pattern,
frame means for mechanically intercoupling said stylus means and said cutting means in fixed relationship so that movements of said stylus are followed by said cutting means,
base means,
means for supporting said frame means on said base means to allow displacement of said frame means relative to said base means in first and second orthogonal directions parallel to said cutting plane,
said means for supporting comprising at least one rod comprising the inside race of a ballbearing and of generally elliptical cross section having a minor diameter orthogonal to said cutting plane only slightly less than its major diameter and surrounded by an outer race of circular cross section with balls therebetween,
the inside diameter of said outer race in the channel thereof including said balls having a diameter substantially equal to the major diameter of said rod plus twice the diameter of a said ball.

4. Apparatus for controlled cutting in accordance with claim 3 wherein there are two mutually orthogonal pairs of said rods for allowing said stylus and cutting means to move together in said first and second directions.

* * * * *